United States Patent

[11] 3,585,943

| [72] | Inventors | Pierre Tanguy;<br>Pierre Carre; Jean Le Boulbouech, all of 2<br>rue Bodelio, Lorient, France |
|---|---|---|
| [21] | Appl. No. | 768,674 |
| [22] | Filed | Oct. 18, 1968 |
| [45] | Patented | June 22, 1971 |
| [32] | Priority | Sept. 23, 1968 |
| [33] | | France |
| [31] | | 167,181 |

[54] MACHINE FOR TWISTING DOUGH
6 Claims, 5 Drawing Figs.

[52] U.S. Cl. ........................................... 107/4, 107/8
[51] Int. Cl. ............................................ A21c 3/08
[50] Field of Search .................................. 107/4, 4.2, 8, 52, 27, 54, 68

[56] References Cited
UNITED STATES PATENTS

| 2,856,868 | 10/1958 | Kennedy | 107/52 X |
| 2,951,456 | 9/1960 | Olgiati | 107/4 (.2) |

*Primary Examiner*—Louis K. Rimrodt
*Attorneys*—Robert E. Burns and Emmanuel J. Lobato

ABSTRACT: Machine for making twists from bands of puff paste which has several dough moving devices some of which are stationary while the others pivot along the general axis of passage of the dough in order to twist the band of dough on itself along its longitudinal axis between the stationary and the pivoting transport devices.

MACHINE FOR TWISTING DOUGH

Twists are cakes made of puff paste which look like a twisted element. They are also called Tortillas.

They are made at the present time only by hand.

Bands of strips of puff paste are cut in the desired shape (70×15mm.) and spun by a complete turn in their middle. The twisted part is then pinched to prevent it from unwinding during cooking.

An entirely manual manufacture entails considerable expenses representing an important part of the cost price.

Experience has shown that a machine for twisting puff paste must fulfill certain conditions.

In effect the puff paste is sprinkled with powdered sugar before cutting and twisting. This layer of sugar does not adhere strongly and requires that the dough strips be carried on belts while they are worked. In no case must the sugared dough rub against a mechanical part at the risk of seeing a deposit of sugar form on this part which would immobilize rapidly the dough strip.

The present machine for making twists is characterized by the fact that strips of puff paste are transported by mechanical means some of which are positioned in a stationary plane while others are placed in a plane which can pivot along the general passing axis of the strip of dough in such a way that between the two planes the strip of dough undergoes a rotation on itself thus forming a twist along its longitudinal axis.

This machine moreover has means for cutting the dough to the desired length and also makes it possible to crush the twist in order that it might not unwind during cooking.

Other characteristics and features of the present invention will appear from a reading of the following description.

The example selected is not limiting and is concerned with an element of a machine for making twists which is mechanically driven.

The source of the mechanical movements is not given since these are entirely conventional.

Reference will be made to the accompanying drawing on which there can be seen:

on FIG. 1 a profile of the twisting unit,

FIG. 3 is a view taken along the plane C of the driving pinions and chains for the rollers of the conveyor belt.

Figure 1:
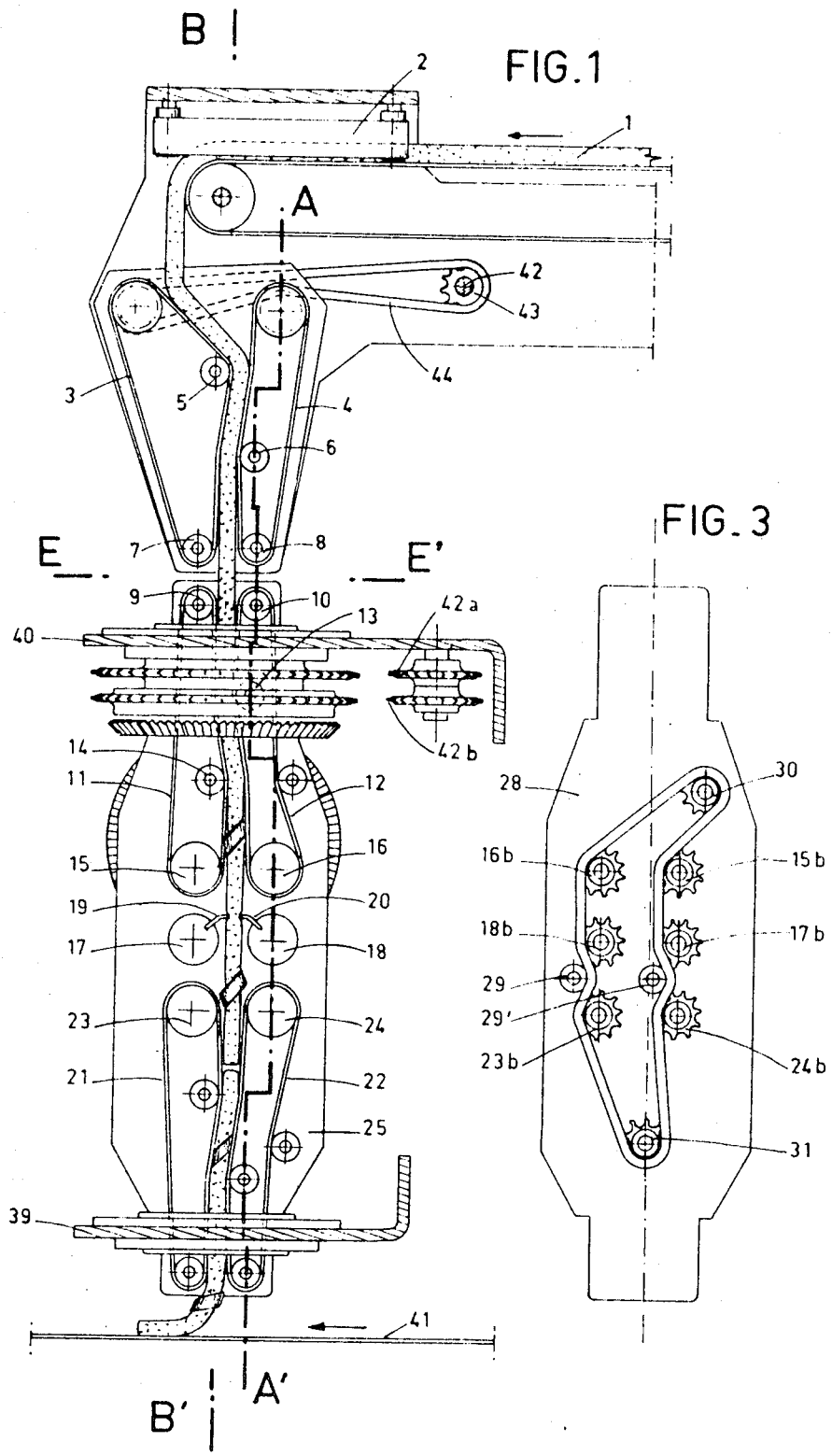

Puff paste is constituted by a large number of layers of dough (general of the order of 700), mutually spaced by layers of fat. From three to nine layers of sugar are included at the end of manufacture. It is fed to the machine generally in the form of a strip having a width of 14 to 16 mm. with 6 mm. thickness.

Its length is infinite and its thickness is constant if it is made mechanically. Its thickness can vary from 5 to 7 mm. if it is made manually. In this case the length of the strips is limited to 3 or 4 meters.

This lack of continuity is without importance in the operation of the machine.

Strips are made by cutting with rotary cutters spaced apart by the desired width. Each of these strips is directed on conveyor belts which are individual to each twisting element. It should be noted that several twisters are positioned transversely above the feed belt of a continuously cooking oven and that several transverse groups succeed to one another.

By way of example: five transverse groups of six twisters each deposit 30 lines of twists on an oven strip 1 meter wide giving a load of 420 twists per meter square.

The individual belt 1 thus feeds one strip of dough. At the end of the belt, two small belts 2 and 2' center the strip above the mechanism. The strip deposits on belt 3 and then is taken over by a second belt 4 which faces the latter. Along the descending vertical path between these two belts 3 and 4 two pressing rollers 5 and 6 apply the strip against the belt which faces it and maintain it with crushing it thanks to the elasticity of belts 3 and 4.

The two rollers 7 and 8 are located in front and at some distance from other rollers 9 and 10 respectively which form part of another set of belts 11 and 12 also provided with tensioning rollers 13 and 14. The belts 11 and 12 roll respectively between the previously mentioned rollers 9 and 10 and driving rollers 15 and 16.

The strip engages itself between the last two belts 11 and 12 then it passes between two rollers 17 and 18 each provided with a knife 19 and 20.

These two knives cut the band when they come face to face upon each revolution.

The strip thus cut is taken away by another set of belts 21 and 22 which are symmetrically identical to belts 11 and 12 and driven by rollers 23 and 24.

Considering these different members (belt and cutting rollers) driven at identical tangential speeds, it goes without saying that the dough strip entering in the machine will come out at the bottom thereof cut in strips which are the length corresponding to the length of the circumference described by the end of knives 19 and 20.

If at a judiciously selected moment, the assembly of belts 11—12, 21—22 and rollers 17—18 assembled on plate 25 effect a complete rotation along axis BB', the strip twists upon itself in the zone EE'. The twist engages between belts 11 and 12 during its formation and upon passing in front of pressing rollers 13 and 14 finds itself crushed and reduced to substantially the thickness of the strip.

Knives 19 and 20 then cut the strip midway between two twists of successive knots.

To obtain this result it is thus necessary that rollers 15, 16, 17, 18, 23, 24 be continuously rotated as well during the immobility as during the rotation of plate 25 (hereinafter denominated top).

To this effect, the movement which is transmitted to the previously mentioned rollers takes place permanently by meshing of a toothed gear 26 (along FIG. 2) on another toothed gear 27. The latter rotates while top 25 is immobile and is immobile when the top rotates. Rotation transmitted to gear 26 connected to the top thus takes place in a relative manner.

Each roller 18, for example, is mounted on a shaft 18a on which is coupled a pinion with a chain 18b. The assembly is journaled in rollers 18a and d encased in plates 25 and 28. The latter is maintained fast of the frontal plate 25 by crosspieces which are not shown.

The chain train which moves the various rollers is represented in FIG. 3. It will be noted that the meshing of the chain on pinions 17b—18b, 23b and 24b by rollers 29 and 29' is tensioned by pinion 30.

The movement is transmitted by pinion 31 on the shaft of which (along FIG. 2) is coupled a pinion 32 meshing on a second 33a.

These two pinions 32 and 33a have a ratio of 1. The last pinion 33a is coupled to a gear 33b which receives its movement through a chain from a pinion 34 fast on gear 26 previously mentioned.

The transmission ratio of 34 to 33b is of one-third.

The diameters of the rollers and the transmission ratios already mentioned are such that when gear 27 makes one turn, the belts move by a third of the length of a twist (for example by 23 mm. for a finished twist of 69 mm.).

The making of a twist can be broken down in the following manner:

The top being immobile, gear 27 turns twice owing to the movement of the toothed ring 35 secured thereto thus moving the strip of dough by two-thirds of its finished length, or 46 mm.

Gear 27 stops and the top makes a turn on itself owing to the movement of gear 36 with which it is integral. The strip thus moves during this rotation of one-third of its finished length of 23 mm. while it twists upon itself in the zone EE'.

Figure 2:
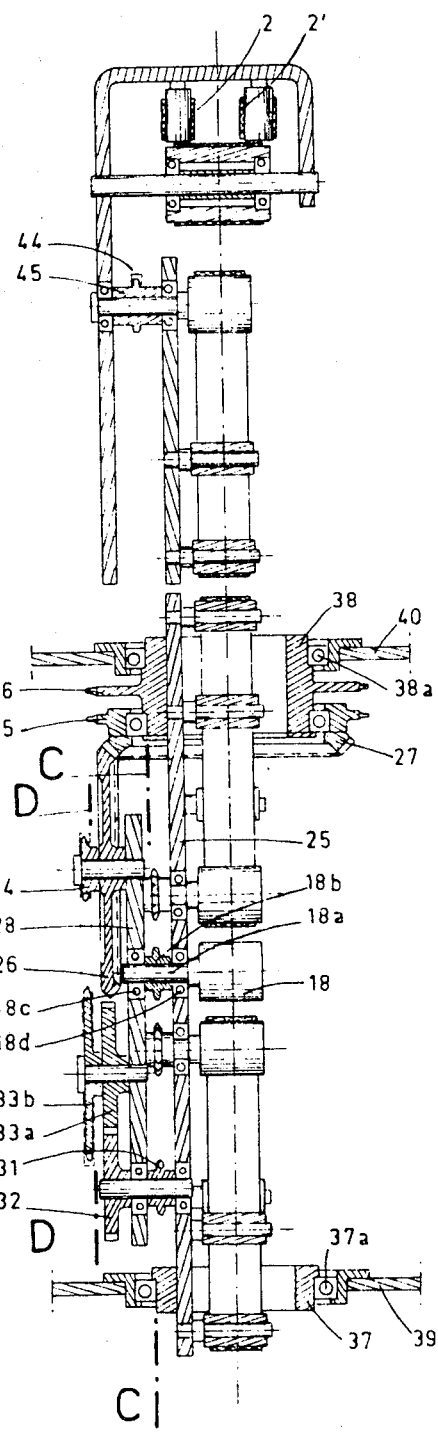
FIG. 2 is a cross section taken along line AA' for driving pinions and rollers for the belts and along the pivoting axis BB' for the members transmitting movements.

The details shown in FIG. 2 make it appear that top 25 is fast to hubs 37 and 38 which turn through rollers 37a and 38b in traverses 39 and 40. These traverses 39 and 40 are mounted transversally to the feed belt of the cooking oven and each have several assemblies which will be described presently.

The twists are deposited on this feed belt 41 while the top is immobile.

The rings 35 and 36 are driven by two chains sent back by pinions 42a and 42b (FIG. 1) moved by suitable means (mechanical or electromechanical) placed laterally to the feed belt 41.

The same is true for the driving of belts 3 and 4 which receive their movements through shaft 42 on which are coupled as many pinions 43 as there are twisting blocks and by chains 44 which mesh on pinions 45 coupled to the rollers driving belts 3 and 4.

When a knot is formed during rotation of the top it can be necessary to reduce the speed of the belts of the said top. In effect, the twisting tends to reduce the length of the dough. Contrarywise, the crushing which follows tends to lengthen the dough. If it is necessary to allow these two variations in length, pinions 32 and 33a must have a special meshing cross section.

Figure 4:
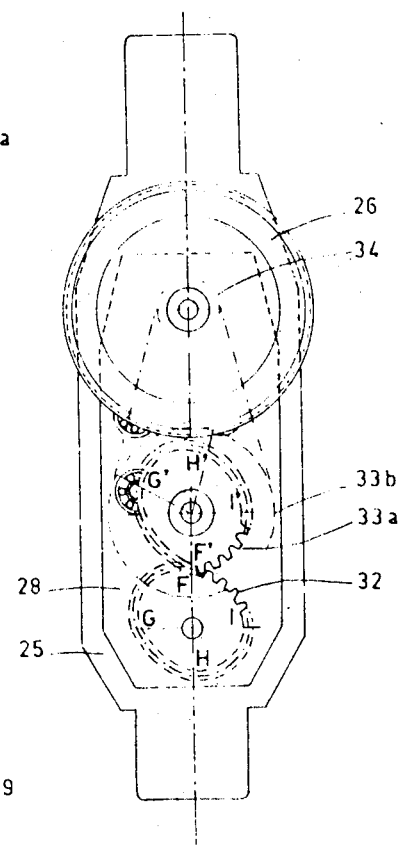
FIG. 4 is a view taken along plane D of the rear side of the twister.

This meshing cross section according to FIG. 4 is such that while retaining an average transmission ratio of 1/1 and a constant angular speed for motor pinion 33a, the angular speed of the driven pinion 32 is variable during a rotation.

During a rotation, the radii of the motor pinion measured at the tangential point with the driven pinion takes increasing and decreasing values it being understood that the sum of the radii of the two measured pinions at that point is constant.

It is thus that from FF' to GG' the transmitted speed decreases then from GG' to HH' it increases to decrease again from HH' to II' and to remain constant from II' to FF'.

The period of decreasing speed corresponds to the twisting time then the crushing of the knot takes place when the speed increases. The two following periods correspond to the normal retake of the length of the strip of dough.

When a strip of dough engages in the machine it is guided automatically by gravity. Arrived in the zone of twist EE' several things can occur. a. If the strip is not yet gripped between the pressing rollers at the moment of twisting the latter will be either incomplete or nonexistant.

In any way, the extremity will follow its path between the belts.

b. If the strip is engaged by a length which exceeds a third of the twist, the twist will form but the knives 19—20 will cut off a small piece of dough and the latter will leave the machine without danger.

The same remarks are valid at the end of the strip.

It is thus seen that the feed by means of a strip of discontinuous length does not interfere with the operation of the machine. It will be only necessary to watch for the removal of the untwisted pieces before they go into the oven.

Figure 5:
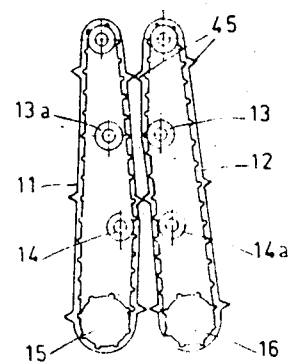
FIG. 5 shows the driving and cutting belt.

In a modification of this machine according to FIG. 5 there is disposed on the outside surface of the conveyor belts projections 45 which go against one another and cut the strip while driving it. Perpendicular to pressure rollers 13 and 14 are positioned other rollers 13a and 14a which make the projection penetrate into the dough at the moment of their passage without however acting in the zones of the belt which are not provided with projections.

It is necessary that the belt be driven without slippage at the risk of having the projections no longer facing one another. For this purpose the driving rollers 15 and 16 are channeled and the inner part of the belt is toothed as shown.

In modification it is possible to replace the conveyor belt by simple rollers. Without changing the operating concept these rollers can either grip the strip of dough owing to an elastic mechanical assembly or freely allow passage of the strip of dough, the same moving by gravity. In one case as in the other, the rollers can be provided with a knife or with a projection for the dough.

Another modification of the machine consists in permanently twisting the dough and in cutting pieces of twisted dough and crushing them at lengths either equal to the space between two knots or of any length.

Without changing the concept of the present invention and bearing in mind the possibility of operating with discontinuous strips, it is possible to cut the said strip to the necessary length before twisting it, for example, by positioning belts along FIG. 5 instead of belts 3 and 4.

What I claim is:

1. Apparatus for making twisted lengths of dough comprising, transport means for transporting and advancing a strip of dough longitudinally therethrough along a given path, said transport means including first transport means rotationally stationary relative to the longitudinal axis of said strip of dough and second transport means rotational relative to said axis, and means to rotate the second transport means intermittently to effect twists on said strip of dough spaced longitudinally on said strip of dough, said second transport means including means to crush the twists while advancing longitudinally through said second transport means.

2. Apparatus according to claim 1, in which each of said transport means comprises a pair of driven opposed endless belts spaced from each other, said strip of dough travelling between the pair of driven belts and in contact therewith for longitudinal advancement by said opposed pair of belts.

3. Apparatus according to claim 1, including means to sever the strip of dough intermediate said twists thereby to sever it into a plurality of individual lengths.

4. Apparatus according to claim 1, including means in each transport means for driving the endless belts at speeds for advancing the strip of dough at a uniform rate of travel longitudinally thereby to maintain the strip from being stretched or shrunken longitudinally including during the twisting thereof.

5. Apparatus according to claim 1, in which said second transport means comprises a pair of driven, opposed endless belts spaced from each other, said endless belts being spaced for receiving the strip of dough between opposed runs of said belts and advancing the strip of dough longitudinally and crushing therebetween twists on said strip of dough made on said strip upstream of said second transport means.

6. Apparatus according to claim 5, including cutting means downstream of said second transport means to sever the strip of dough intermediate the crushed twists thereby to sever the strip into a plurality of individual lengths.